United States Patent
Nakagawa et al.

(10) Patent No.: US 9,285,200 B2
(45) Date of Patent: Mar. 15, 2016

(54) PROCESSING DIAMETER MEASUREMENT DEVICE WITH GRINDER MEASUREMENT MALFUNCTION ASSESSMENT FUNCTION

(71) Applicant: NTN CORPORATION, Osaka (JP)

(72) Inventors: Takashi Nakagawa, Kuwana (JP); Yasushi Kawasaki, Kuwana (JP)

(73) Assignee: NTN CORPORATION, Osaka (JP)

( * ) Notice: Subject to any disclaimer, the term of this patent is extended or adjusted under 35 U.S.C. 154(b) by 52 days.

(21) Appl. No.: 14/369,074

(22) PCT Filed: Dec. 19, 2012

(86) PCT No.: PCT/JP2012/082876
§ 371 (c)(1),
(2) Date: Jun. 26, 2014

(87) PCT Pub. No.: WO2013/099721
PCT Pub. Date: Jul. 4, 2013

(65) Prior Publication Data
US 2014/0373377 A1    Dec. 25, 2014

(30) Foreign Application Priority Data
Dec. 28, 2011    (JP) .................................. 2011-287098

(51) Int. Cl.
*G01B 5/08*    (2006.01)
*B24B 49/04*    (2006.01)
(Continued)

(52) U.S. Cl.
CPC ... *G01B 5/08* (2013.01); *B24B 5/08* (2013.01); *B24B 5/35* (2013.01); *B24B 49/02* (2013.01); *B24B 49/04* (2013.01)

(58) Field of Classification Search
CPC .................................. G01B 5/08; B24B 49/04
USPC .......................... 33/551, 552, 555.1, 626, 783
See application file for complete search history.

(56) References Cited

U.S. PATENT DOCUMENTS 4,112,629 A * 9/1978 Possati .................... B24B 49/04
451/27
4,223,484 A * 9/1980 Giardino ................ B23Q 15/02
451/11
(Continued)

FOREIGN PATENT DOCUMENTS

CN    1496788    5/2004
CN    1593849    3/2005
(Continued)

OTHER PUBLICATIONS

PCT International Preliminary Report on Patentability mailed Jul. 10, 2014 in corresponding International Patent Application No. PCT/JP2012/082876.
(Continued)

*Primary Examiner* — G. Bradley Bennett (57) ABSTRACT

An in-process diameter measuring apparatus equipped with a function of determining a measurement abnormality of a grinding machine is provided. The apparatus measures the diameter of a to-be-processed surface of a workpiece in the process of the workpiece. A sizing device (2) is provided including measuring heads (2X and 2Y) for detecting two locations spaced apart from each other in a diametric direction of the workpiece (W). Based on respective measured values of those measuring heads (2X and 2Y), the diametric dimension is calculated by a dimension calculator (32). With respect to the abnormality detection, the difference between the measured values (G1 and G2) of the measuring heads (2X and 2Y) is determined by a measurement abnormality determiner (34) and the occurrence of the measurement abnormality is determined when this measurement value difference ($\Delta\alpha$) depart from a predetermined permissible range.

12 Claims, 6 Drawing Sheets

(51) Int. Cl.
*B24B 5/35* (2006.01)
*B24B 5/08* (2006.01)
*B24B 49/02* (2006.01)

(56) References Cited

U.S. PATENT DOCUMENTS

| | | | | |
|---|---|---|---|---|
| 4,295,301 | A * | 10/1981 | Barth | B24B 49/18 125/11.03 |
| 5,547,414 | A * | 8/1996 | Ohmori | B24B 53/001 451/21 |
| 5,679,061 | A | 10/1997 | Thielenhaus | |
| 6,213,843 | B1 * | 4/2001 | Kramer | B23H 5/04 451/21 |
| 6,905,393 | B2 | 6/2005 | Goransson | |
| 2004/0133299 | A1 | 7/2004 | Goransson | |
| 2006/0026853 | A1 * | 2/2006 | Trionfetti | B24B 49/04 33/552 |
| 2006/0042109 | A1 * | 3/2006 | Kanai | G01B 7/12 33/555.1 |
| 2007/0202776 | A1 * | 8/2007 | Gretler | B24B 55/02 451/5 |
| 2013/0255092 | A1 * | 10/2013 | Trionfetti | B24B 49/045 33/555.1 |
| 2014/0213148 | A1 * | 7/2014 | Gaegauf | B24B 19/125 451/11 |
| 2015/0239093 | A1 * | 8/2015 | Fukui | B24B 49/02 451/5 |

FOREIGN PATENT DOCUMENTS

| | | |
|---|---|---|
| JP | 5-131352 | 5/1993 |
| JP | 2002-239876 | 8/2002 |
| JP | 2003-94293 | 4/2003 |
| JP | 2007-30103 | 2/2007 |
| JP | 2008-161960 | 7/2008 |
| JP | 2010-105129 | 5/2010 |

OTHER PUBLICATIONS

International Search Report mailed Mar. 12, 2013 in corresponding International Patent Application No. PCT/JP2012/082876.
Japanese Office Action dated Jun. 9, 2015 in corresponding Japanese Patent Application No. 2011-287098.
Chinese Office Action dated Sep. 25, 2015 in corresponding Chinese Patent Application No. 201280064388.0.

* cited by examiner

PROCESSING DIAMETER MEASUREMENT DEVICE WITH GRINDER MEASUREMENT MALFUNCTION ASSESSMENT FUNCTION

CROSS REFERENCE TO THE RELATED APPLICATIONS

This application is a U.S. national stage application of PCT/JP2012/082876 filed Dec. 19, 2012 and claims foreign priority benefit of Japanese Application No. 2011-287098 filed Dec. 28, 2011 in the Japanese Intellectual Property Office, the contents of which are incorporated herein by reference.

BACKGROUND OF THE INVENTION

1. Field of the Invention

The present invention relates to an in-process diameter measuring apparatus for measuring the diameter of a to-be-processed surface of a work during the execution of a process of grinding an inner or outer peripheral surface of the work of a cylindrical shape or a shaft-like shape with the use of a grinding machine. The present invention specifically relates to an in-process diameter measuring apparatus having a measurement abnormality determining function for detecting the occurrence of an abnormality such as, for example, a bite of foreign matter in between a feeler of the sizing instrument and the work.

2. Description of Related Art

The grinding process with the use of a grinding machine is generally classified into three types; a rough grinding procedure for roughly grinding a workpiece to be processed, a fine grinding procedure for finely grinding a workpiece to be processed and a spark-out grinding procedure for finishing a deformed portion of, for example, a grindstone by the effect of a residual pressure. In addition the grinding process may include a dressing procedure for repairing the frictional wear of, for example, the grindstone. Such a grinding machine is generally equipped with a sizing device and has incorporated therein a scheme by which dimensional errors in the processed product are minimized to thereby increase the finished dimensional accuracy.

It has, however, been found that once a foreign matter such as, for example, grinding scrapes or ground particles is bitten in between a feeler of the sizing device and the workpiece during the processing, a dimensional error occurs in the finished dimensions and, if the dimensional error is large, the workpiece so processed with the dimensional error will become a defective product or require some adjustments. In order to avoid those inconveniences, the need is realized to detect a measurement abnormality and then to remove such measurement abnormality. The patent documents 1 and 2 listed below suggest such a method.

[Patent Document 1] JP Laid-open Patent Publication No. 2007-30103

[Patent Document 2] JP Laid-open Patent Publication No. 2002-239876

SUMMARY OF THE INVENTION

According to the patent document 1 listed above, biting of the foreign matter is deemed occurring in the event that a measured value of the diametric dimension of the sizing device increases abruptly. It has, however, been found that in the event that the dressing procedure takes place in the process of a workpiece or during the spark-out, release of a pressure used to urge the grindstone results in liberation of a deformation of the workpiece being processed or movement of the workpiece being processed. For this reason, there is the possibility that the measured value of the sizing device changes abruptly and the presence of a measurement abnormality may be erroneously detected, that is, false positives are detected. Since the measurement abnormality is erroneously detected when speed changes abruptly as just described, there is no way other than to set a high threshold value for the determination of an abnormality. Then, the presence of the abnormality cannot be accurately detected particularly when the bitten foreign matter is minute, resulting in the occurrence of an error in the finished dimension.

The patent document 2 listed above suggests the removal of the foreign matter biting by temporarily separating the feeler from a to-be-processed surface in the detection process of the measurement abnormality by the sizing device. Regarding the abnormality identification, however, the biting of the foreign matter is determined as occurring in reference to the abrupt increase of the measured value of the diametric or radial dimension of the sizing device in a manner similar to that disclosed in the patent document 1 referred to above. Because of that, as is the case with the above mentioned patent document 1, an erroneous detection of the measurement abnormality often occurs as a result of the abrupt change of the measured value during the dressing procedure and the spark-out and, therefore, the threshold value is in any way required to be set at a large value.

In view of the foregoing, the present invention has for its primary object to provide an in-process diameter measuring apparatus of a type in which, when measurement of the diametric dimension of a to-be-processed surface of a workpiece being processed is measured, an accurate abnormality detection can be accomplished by differentiating between an output change of the sizing device, which is caused by an abnormality such as, for example, a foreign matter biting, and an output change during, for example, a dressing. Thus, the apparatus is also capable of detecting even a measurement abnormality such as, for example, a minute foreign matter biting.

In order to facilitate a better understanding of the summary of the present invention, the following summary of the present invention will be described with the aid of reference signs employed in the accompanying drawings that illustrate preferred embodiments of the present invention.

An in-process diameter measuring apparatus equipped with a function of determining a measurement abnormality of a grinding machine designed in accordance with one aspect of the present invention includes a workpiece support mechanism to support a workpiece of a circular shape in section and to rotate the workpiece about a center axis; a grindstone drive mechanism to grind a to-be-supported surface using a grindstone, the to-be-processed surface including an inner peripheral surface or an outer peripheral surface of the workpiece, and a control device configured to control the workpiece support mechanism and the grindstone drive mechanism. The apparatus measures the diameter of the to-be-processed surface of the workpiece in the process of the workpiece by means of the grinding machine.

The apparatus comprises:

a sizing device to include a plurality of measuring heads that contacts a plurality of respective circumferential locations of the to-be-processed surface, the plurality of respective circumferential locations including at least two locations spaced apart from each other in a diametric direction of the to-be-processed surface of the workpiece, and to measure respective diametric positions of locations which the heads contact;

a dimension calculator 32 configured to calculate the diameter of the to-be-processed surface based on measured values of the plurality of the measuring heads of the sizing device; and a measurement abnormality determiner 34 configured to determine a difference between measured values of the two measuring head out of the plurality of the measuring heads, the measuring heads measuring respective positions of the respective two locations of the to-be-processed surface that are spaced apart from each other in a diametric direction, and to determine the occurrence of a measurement abnormality in the event that the difference departs from a predetermined permissible range.

The determination of occurrence of the measurement abnormality by the measurement abnormality determiner 34 may be repeatedly performed during a predetermined period of the processing or, alternatively, performed once, or non-continuously a plurality of times in the process of the workpiece. The workpiece referred to above is, for example, a cylindrical material, a shaft like material or a ring shaped material.

According to the present aspect, the diameter of the to-be-processed surface is calculated by the dimension calculation unit 32 based on respective measured values of a plurality of the measuring heads. For example, by summing together respective outputs of the measuring heads at two locations spaced apart from each other in a diametric direction, the diameter of the to-be-processed surface is calculated.

With respect to the abnormality detection, it is determined not based on the summed value of the respective outputs of the measuring heads at the two locations, but based on the difference of the measured values of the two measuring heads. In other words, the difference of the measured values of the two measuring heads, which are capable of measuring respective positions of those two locations spaced apart from each other in the diametric direction, by means of the measurement abnormality determiner 34 and, in the event that this measured value difference departs from the predetermined allowable range, it is determined that the measurement abnormality has occurred.

In the event that foreign matter (such as, for example, grinding dust and/or abrasive grains of the grindstone) is bitten between one of the measurement head and the to-be-processed surface, only the measured value of the measuring head that has involved the biting of the foreign matter increases and, correspondingly, the difference between the respective measured values of the measuring heads increases. In contrast thereto, during the dressing or the spark-out, the measured values of the two measuring heads change similarly and the measured value difference of those two measuring head changes little. Since the abnormality occurrence is determined on the basis of the measured value difference, no erroneous detection occur during the dressing or the spark-out and, accordingly, the predetermined permissible range for the determination of the abnormality occurrence, that is, the threshold value can be set to a small value. Thus, even the measurement abnormality resulting from the biting of the minute foreign matter can be detected and the accuracy of the abnormality detection can be increased.

In view of the above, waste of workpieces hitherto processed at the time of occurrence of the measurement abnormality can be minimized and waste resulting from the later adjustment necessitated because of the erroneous detection can be minimized.

Where the workpiece support mechanism includes a magnet chuck to attract one end face of the workpiece by a magnetic force and to rotate such workpiece so as to develop a centripetal action, and two shoes to support the workpiece, in a fashion slightly offset from a center of rotation of the magnet chuck, in contact with two locations within the semi-circle of a circumferential surface of the workpiece by the grindstone pushing the workpiece, the separating or weakening procedure, in which the measurement abnormality determiner 34 does not perform the determination of the measurement abnormality, may be included in the spark-out procedure. In the spark-out procedure, a workpiece is processed by an elastic restoring force brought about as a result of an elastic deformation occurring in the grindstone support while the progress of cutting of the grindstone is halted.

In a grinding process applied to the peripheral surface of the workpiece of a cylindrical configuration, it is a general practice to perform it with the use of the magnet chuck and the shoes as referred to above. In the practice of this support method, the workpiece can be urged against the sides of the respective shoes, so that the workpiece is supported having been slightly offset. During the spark-out procedure, by weakening the pressing with the grindstone, the offset is reduced to zero. At this time, the feelers of the two measuring heads that are spaced apart from each other in the diametric direction come to be moved in the same direction and a change of the measured value of each of those measuring heads resulting from such movement comes to be included in the difference of the measured values. Accordingly, the difference between the measured values abruptly increased during the spark-out, resulting in an erroneous detection apt to occur. For this reason, during the spark-out procedure, it may be undesirable to perform the determination of the measurement abnormality with the measurement abnormality determiner 34, which uses the difference referred to above.

In the configuration described hereinabove, there may be further provided a threshold calculator 33 configured to determine a reference value or baseline by performing a predetermined statistical procedure on a difference between respective measured values of the two measuring heads, which values are captured during a predetermined reference calculation measuring period in the process of the workpiece and to calculate a threshold value, which is a limit value within the predetermined permissible range with respect to this reference value. The measurement abnormality determiner 34 performs the determination of the measurement abnormality in a processing subsequent to the calculation of the threshold value.

As a method of determining the proper threshold value of the predetermined permissible range, measurement may be made with the use of a master work so that the measured value of the master work can be determined, or it may be determined with the use of design calculations. However, in successively grinding a number of workpieces, a thermal displacement may occur as a result of, for example, a processing heat in dependence on the time elapsed subsequent to the switching-on of an electric power source of the grinding machine. In such case, if the measured values obtained when the thermal displacement takes place are used during the abnormality determination, a further proper threshold value can be defined. Also, even though, when the measured values obtained as a result of a number of times are statistically processed, variation occurs among those individual measured values, a stabilized and proper threshold value can be defined. Accordingly, even when the threshold value is set to a small value, the possibility of false negatives can be eliminated and, hence, a further reliable abnormality detection can be accomplished.

The statistical procedure performed by the threshold calculator 33 may be a procedure to determine the average value of differences of the plurality of the measured values of the two measuring heads, which are captured during the predetermined reference calculation measuring period. By using the average value, the proper reference value can be determined with a simplified calculation.

Where the statistical procedure is carried out, the control device may cause the grinding machine to perform a rough grinding procedure to roughly process the workpiece and a fine grinding procedure to finely process the workpiece at a cutting speed of the grindstone which is lower than that during the rough grinding procedure, and the reference calculation measuring period may be rendered to be a period just before termination of the rough grinding procedure.

It may occur that black bark occurs in the workpiece to be ground when such workpiece is heat treated as the preceding procedure, and even though no black bark occurs therein, the surface is rough. On the other hand, the necessity of performing the abnormality detection of the foreign matter biting is low during the rough grinding procedure. For this reason, it may be proper to render the period just before the termination of the rough grinding procedure may to be the reference calculation measuring period.

In the configuration described hereinabove, where the control device causes the grinding machine to perform a rough grinding procedure to roughly process the workpiece, a fine grinding procedure to finely process the workpiece at a cutting speed of the grindstone which is lower than that during the rough grinding procedure, and a spark-out procedure to process the workpiece by the effect of an elastic restoring force of an elastic deformation induced in a grindstone support member while a progress of cutting with the grindstone is interrupted, the measurement abnormality determiner 34 may perform the determination of the measurement abnormality in either one of the fine grinding procedure, and the fine grinding and the spark-out procedures.

The measurement abnormality such as, for example, the biting of the foreign matter and others will often become problematic during the fine grinding procedure and the spark-out procedure and, therefore, it is desirable to perform the determination of the measurement abnormality during those procedures.

In this case, arrangement may be that the workpiece support mechanism includes a magnet chuck to attract one end face of the workpiece with a magnetic force and to rotate such workpiece so as to develop a centripetal action, and two shoes to support the workpiece, in a fashion slightly offset from a center of rotation of the magnet chuck, in contact with two locations within the semicircle of a circumferential surface of the workpiece. The control device causes the grinding machine to perform a dressing procedure comprised of an operation to dress, while the grindstone is moved to a dressing device, during a time span between the rough grinding procedure and the fine grinding procedure and to subsequently return the grindstone back to a position before the dressing.

A threshold calculator 33 may be further provided to determine a reference value by performing a predetermined statistical procedure on a difference between respective measured values of the two measuring heads, which values are captured during a predetermined reference calculation measuring period in the process of the workpiece and to calculate a threshold value. The predetermined reference calculation measuring period is rendered to be a period just before the termination of the rough grinding procedure, and the statistical procedure is a procedure to determine the average of a plurality of differences of a respective plurality of a pair of the measured values of the two respective measuring heads, which values are captured during the predetermined reference calculation measuring period.

In the case of this embodiment, the proper threshold value resulting from the above described statistical procedure is determined and the measurement abnormality can be determined during a proper period.

In the configuration described hereinabove, the control device may be so configured as to cause the two measuring heads to be again brought into contact with the to-be-processed surface once separated therefrom, in the event that the measurement abnormality is determined by the measurement abnormality determiner 34, and also to cause the processing to continue when the difference between the respective measured value of the two measuring heads, after they are again brought contact, falls within the predetermined permissible range.

It may occur that, in the event of the determination of the measurement abnormality, the biting of the foreign matter can be resolved when the measuring heads are temporarily separated from the to-be-processed surface. For this reason, if the difference between the measured values of the two measuring heads, which are again brought into contact, is within the predetermined permissible range, continuance of the processing may result in the grinding process taking place with no need to unnecessarily interrupted and also with no erroneous determination of the measurement abnormality occurring.

Any combination of at least two features, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF THE EMBODIMENTS

An in-process diameter measuring apparatus equipped with a measurement abnormality determining function, which apparatus is designed in accordance with a first embodiment of the present invention, will now be described in detail with reference to the accompanying drawings. In this embodiment, the in-process diameter measuring apparatus with the measurement abnormality measuring function is applied to an inner surface grinding machine. The in-process diameter measuring apparatus with the measurement abnormality determining function of the grinding machine is of a type in which not only is a sizing device 2 provided in the grinding machine 1, but also a control device 3 of the grinding device 1 is provided with a measurement abnormality determiner 34 and others.

Figure 1:
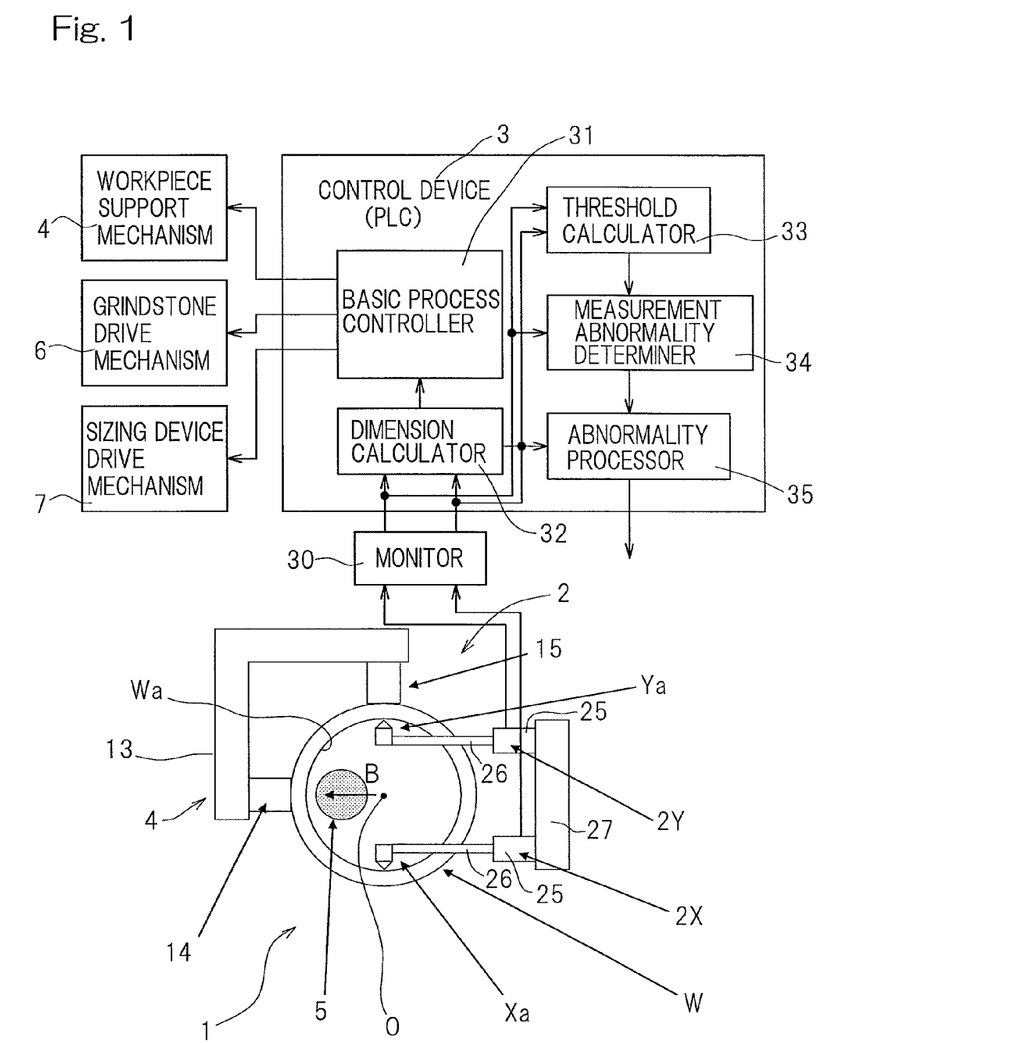
FIG. 1 is a diagram showing a in-process diameter measuring apparatus equipped with a measurement abnormality determining function of a grinding machine designed in accordance with a first embodiment of the present invention, which diagram includes a top plan view of a sizing device of the in-process diameter measuring apparatus and a block diagram showing a conceptual construction of a control system.

The grinding machine 1 includes a workpiece support mechanism 4 for supporting a workpiece W of a round sectioned shape or a circular shape in section and rotating such workpiece W about a center axis, a grindstone drive mechanism 6 for causing a grindstone 5 to grind a to-be-processed surface Wa which will become an inner peripheral surface of the workpiece W, and the control device 3 for controlling the workpiece support mechanism 4 and the grindstone drive mechanism 6. The sizing device 2 is driven by a sizing device drive mechanism 7. The control device 3 has a function of controlling the sizing device drive mechanism 7. The workpiece W may be a cylindrical or a ring shaped material, for example, a material which will become a raceway ring of a rolling bearing assembly. In the example as shown, the workpiece W is a cylindrical material which will become a bearing inner ring, and the to-be-processed surface Wa is represented by an inner peripheral surface comprised of a cylindrical surface of the bearing ring.

Figure 2:
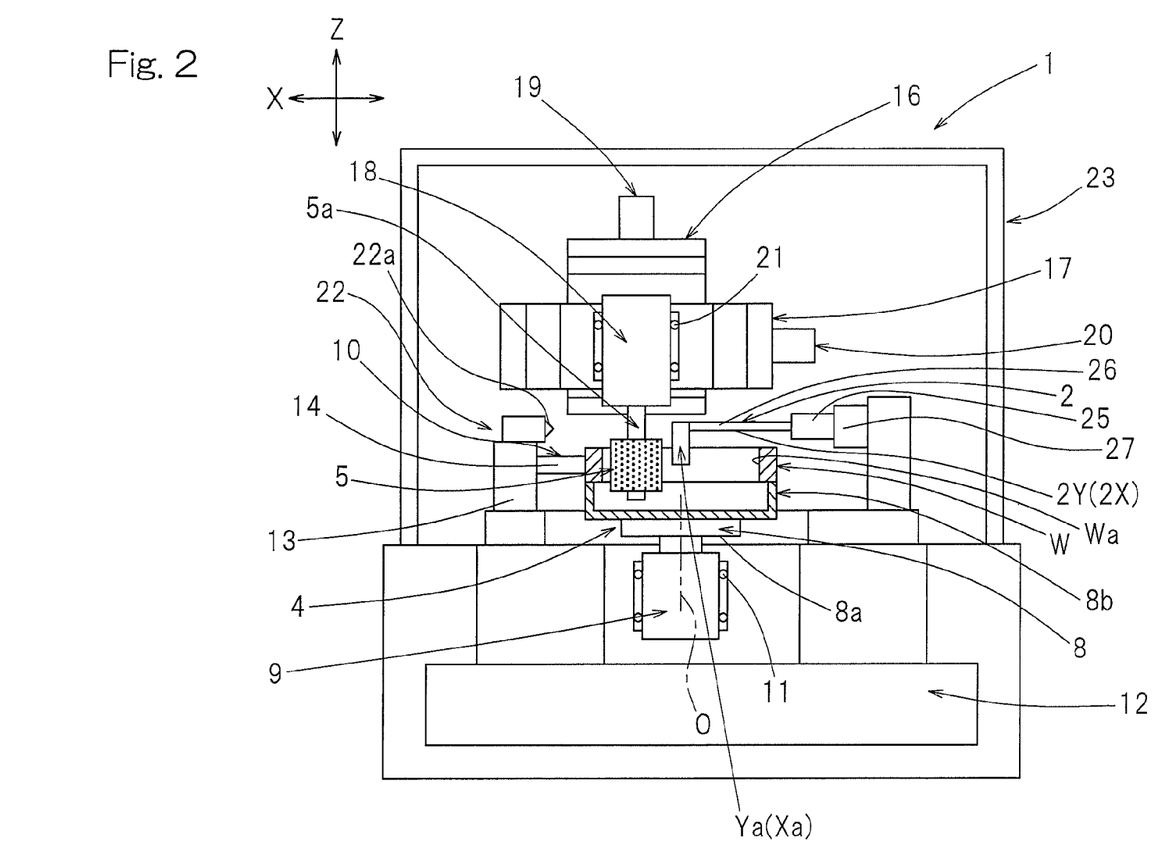
FIG. 2 is a partially sectioned front elevational view of a grinding device shown in FIG. 1.

FIG. 2 illustrates a partially sectioned front elevational view showing the details of the grinding machine 1. The workpiece support mechanism 4 employed therein includes a magnet chuck 8, a spindle drive motor 9 for rotating the magnet chuck 8, and a shoe mechanism 10. The spindle drive motor 9 has its motor output shaft and is fixedly mounted on a machine bed 12 by means of fixing members 11 such as bolts with the motor output shaft oriented upwardly, and the magnet chuck 8 is fitted to an upper end of the motor output shaft of the spindle drive motor 9. The magnet chuck 8 includes a chuck main body 8a in the form of a permanent magnet or an electromagnet and an upwardly oriented round backing plate 8b. The magnetic chuck 8 attracts a downwardly oriented end face of the cylindrical workpiece W and rotates together with the workpiece W so as to develop a centripetal action through a magnetic force.

As shown in FIG. 1, the shoe mechanism 10 provided with a first, front side shoe 14 and a second, rear side shoe 15 on the bed 12 through a support member 13. Those two shoes 14 and 15 are provided spaced an angle of 90° from each other about a center axis O of the magnet chuck 8. The shoes 14 and 15 are held in sliding contact with an outer peripheral surface of the workpiece W. Where the workpiece W rotates in a counterclockwise direction about an axis of rotation which is defined by a center O of the magnet chuck 8, a center axis of the workpiece W is offset a slight distance from the center O of the magnet chuck 8. The direction in which it is offset is in which it is spaced from the front shoe 14 an angle of 45° in a counterclockwise direction about the center O of the magnet chuck 8.

The grindstone drive mechanism 6 includes a Z-axis slide 16 and an X-axis slide 17, both for moving the grindstone 5, and a grindstone shaft motor 18 for rotating the grindstone 5. The Z-axis slide 16 is movably mounted on the bed 12 for movement in a up and down direction (Z-axis direction) by means of a guide mechanism (not shown) and can be selectively ascended or descended by a Z-axis servo motor 19 through a rotary to linear motion translating mechanism (not shown) such as, for example, a ball screw. The X-axis slide 17 is movably mounted on the Z-axis slide 16 for selective advance or retraction in a horizontal direction (X-axis direction) through a guide mechanism (not shown) and can be selectively advanced or retracted by an X-axis servo motor 20 through a rotary to linear motion translating mechanism (not shown) such as a ball screw. The grindstone shaft motor 18 is installed on the X-axis slide 17 by means of fixing members 21 such as bolts while having been oriented downwardly, and, its motor shaft is directly connected with a grindstone shaft 5a of the cylindrical rotary grindstone 5.

A dressing device 22 having a fixed diamond 22a is mounted on the support member 13 at a location above the front shoe 14, and the grindstone 5 is capable of being moved by a grindstone drive mechanism 6, best shown in FIG. 1, to a position at which it is dressed in contact with the fixed diamond 22a. A shroud 23 encloses therein various mechanisms on the machine bed 12 of the grinding machine 1.

As shown in FIG. 1, the sizing device 2 referred to previously makes use of a plurality of, for example, two in the illustrated embodiment, measuring heads held in position to contact respective portions of the to-be-processed surface Wa of the workpiece W, which are spaced from each other in a diametric direction or radial direction, to thereby detect radially spaced positions at which contact takes place between the heads and the respective two diametrically spaced portions of the to-be-processed surfaces Wa. The two measuring heads referred to above are indicated as a first measuring head 2X and a second measuring head 2Y. It is, however, to be noted that the sizing device 2 may make include, in addition to those first and second measuring heads 2X and 2Y, a further measuring head contactable with another circumferential location of the to-be-processed surface Wa to detect a radial position of the site of such contact. However, in describing this embodiment, reference will be made to the use of the two, first and second measuring heads 2X and 2Y. Those first and second measuring heads 2X and 2Y are mounted on a common measuring head support platform 27.

Each of the first and second measuring heads 2X and 2Y includes a feeler Xa or Ya contactable with the to-be-processed surface Wa provided in a tip end portion of a corresponding measuring arm 26 that extends from a head main body 25. Each of the feelers Xa and Ya, together with its corresponding arm 26, is urged by an air pressure on a pressed side towards the to-be-processed surface Wa by a pressing mechanism (not shown), which is provide within a measuring head support body 27, and is separated away from the to-be-processed surface Wa upon release of the air pressure. Also, one of the measuring heads 2X and 2Y and the magnet chuck 8 is rendered to be retractable by a retracting mechanism (not shown) so that it will not interfere with the workpiece W when the workpiece W is fitted or removed relative to the magnet chuck 8.

Figure 3:
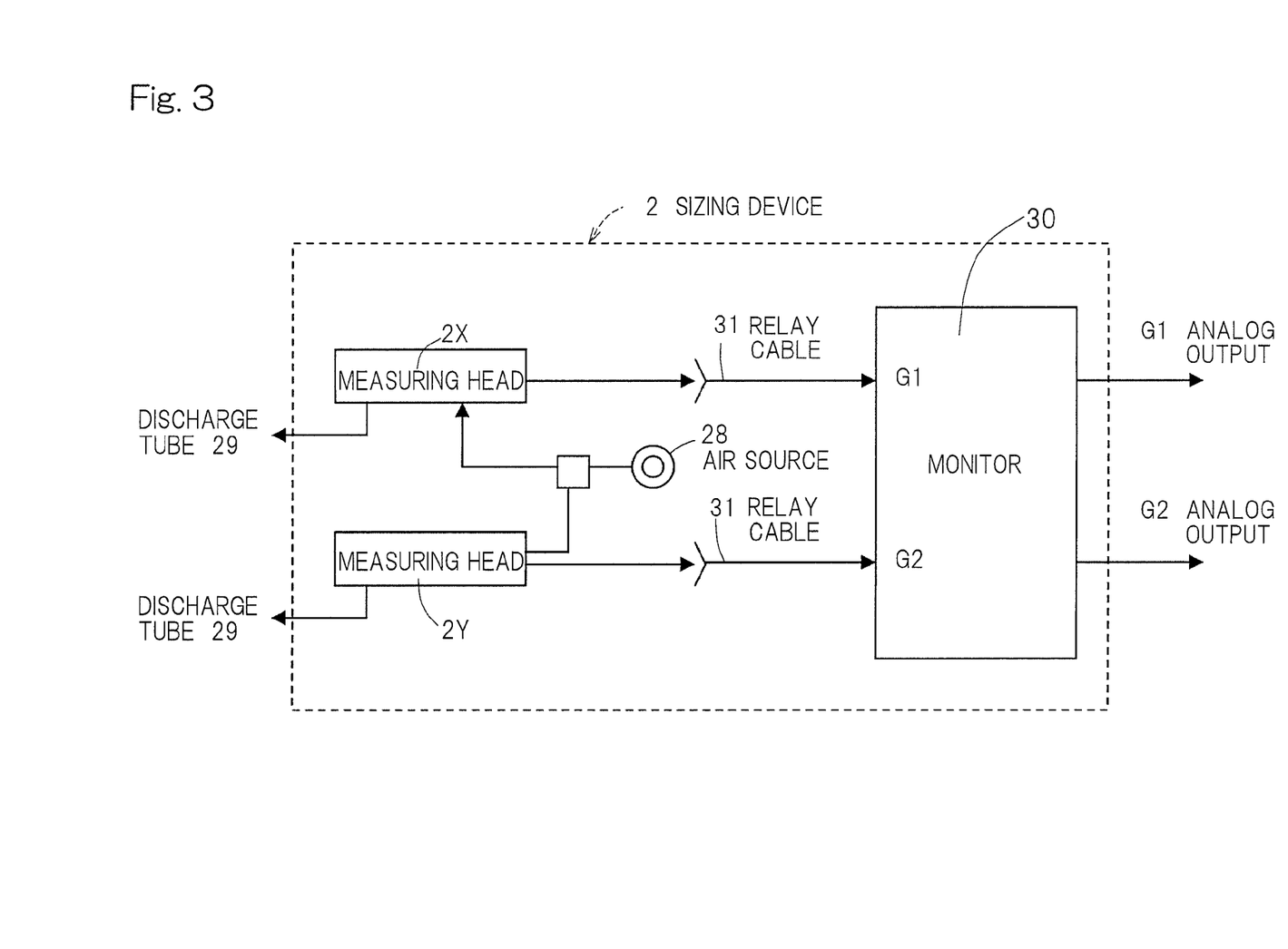
FIG. 3 is an explanatory diagram showing a conceptual construction of the sizing device shown in FIG. 1.

FIG. 3 illustrates a block diagram showing a conceptual construction of the sizing device 2. Each of the measuring heads 2X and 2Y is such that a compressed air is supplied from an air source 28 to the pressing mechanism (not shown) provided in the respective measuring head 2X or 2Y and is discharged from a discharge tube 29. Each of the measuring heads 2X and 2Y supplies a signal indicative of a measured value to a monitor 30 comprised of electronic circuits through a corresponding relay cable 31. The monitor 30 outputs respective measured values G1 and G2 of the measuring heads 2X and 2Y in the form of corresponding analog signals. The measured value G1 and G2 represent, for example, the respective distances from the center axis O of the magnet chuck 8.

Referring to FIG. 1, the control system will be described in detail. The control device 3 is comprised of a programmable controller (a so-called PLC) and a motion controller and an internal program (not shown) of a ladder format that are executable by those controllers, and by of those, the following basic process controller 31, dimension calculator 32, threshold calculator 33, measurement abnormality determiner 34 and abnormality processor 35 are constituted. The threshold calculator 33, the measurement abnormality determiner 34 and the abnormality processor 35 function to detect and process a measurement abnormality.

The basic process controller 31 causes the workpiece support mechanism 4, the grindstone drive mechanism 6 and the sizing device drive mechanism 7 to perform respective predetermined operations for grinding the workpiece W. The dimension calculator 32 adds up the measured values G1 and G2 of the respective two measuring heads 2X and 2Y, which are outputted from the sizing device 2 and then calculates the diameter of the to-be-processed surface Wa of the workpiece W at the time of measurement. The basic process controller 31 performs switching of a processing type (rough grinding, fine grinding, spark-out and others) in dependence on the diameter as of measurement time of the to-be-processed surface Wa which has been calculated by the dimension calculator 32. The control device 3 may have an analog-to-digital converter (not shown) and does accordingly convert the measured values G1 and G2 of the analog signals, which are outputted from the monitor 30 of the sizing device 2, into measured values G1 and G1 of digital signals, after the analog-to-digital conversion by the analog-to-digital converter. The analog-to-digital converter may be the one provided outside the control device 3. It is to be noted that the spark-out is a process in which the grinding is performed by the utilization of an elastic restoring force brought about as a result of an elastic deformation occurring in the grindstone support member such as the grindstone shaft 5a and others while the progress of cutting of the grindstone is halted.

The measurement abnormality determiner 34 calculates continuously (repeatedly) a difference $\Delta\alpha$ of the measured values G1 and G2 of the measuring heads 2X and 2Y, which are captured by the control device 3 and compares the absolute value of the difference $\Delta\alpha$ with a threshold value (difference threshold value) Da which is a limit value of a predetermined allowance range so that the occurrence of a measurement abnormality may be determined in the event that the absolute value of the difference $\Delta\alpha$ exceeds this predetermined allowance range. The difference threshold value Da is employed in the form of a value calculated by the threshold calculator 33 so far as the illustrated embodiment is concerned. Alternatively, it may be determined by measurement of a master work or the like, or the difference threshold value may be determined suitably by means of a series of experiments and/or simulations and others.

Figure 6:
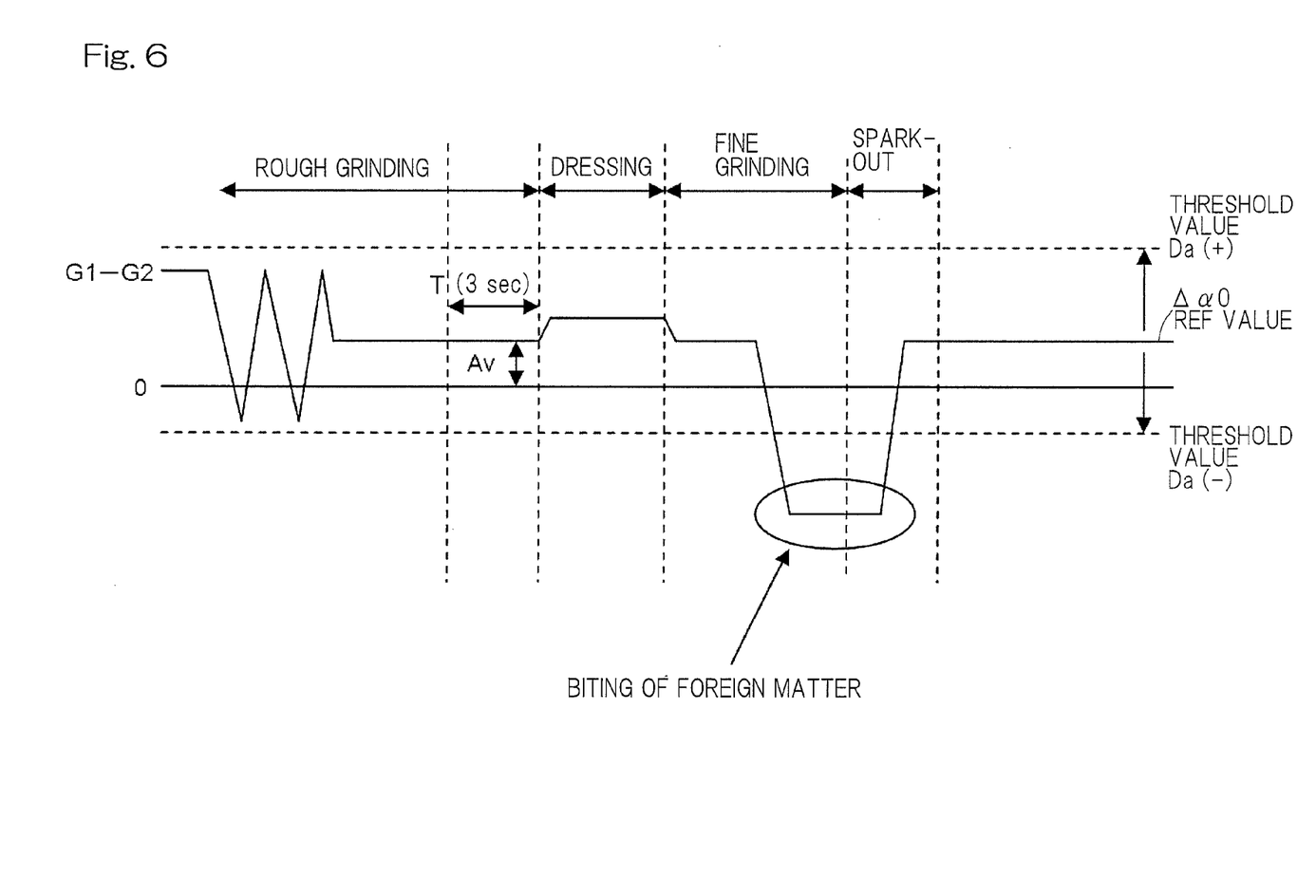
FIG. 6 is a chart showing an example of a measured value difference of a measuring head of the in-process diameter measuring apparatus shown in FIG. 1.

The threshold calculator 33 determines, as shown in FIG. 6, a reference value $\Delta\alpha 0$ by performing a predetermined statistical procedure on the difference between the measured values G1 and G2 of the two measuring heads 2X and 2Y, which values have been captured during a predetermined reference calculation measuring period T in the process. Then the threshold calculator 33 render a limit value, which is a predetermined range of plus and minus with respect to the reference value $\Delta\alpha 0$ intervening therebetween, to be the difference threshold value Da. As this statistical procedure, in the embodiment now under discussion, the average value Av resulting from an arithmetic average of the difference of the measured values G1 and G2 of the two measuring heads 2X and 2Y, which values have been captured during the predetermined reference calculation measuring period referred to above and this average value Av is rendered to be the reference value $\Delta\alpha 0$. The threshold calculator 33 may, however, determine the calculation of the reference value $\Delta\alpha 0$ by the previously described statistical procedure by means of, for example, the geometric mean, the moving average or the standard deviation. In the embodiment now under discussion, the reference calculation measuring period T is chosen as a period immediately before termination of the rough grinding procedure particularly where the grinding is carried out by means of the rough grinding procedure, fine grinding procedure and spark-out procedure of the workpiece W.

Referring still to FIG. 1, the abnormality processor 35 referred to above is a means for causing the grinding machine 1 and the other to perform a predetermined operation in the event that the measurement abnormality determiner 34 determines the occurrence of a measurement abnormality. It is to be noted that arrangement may be made that this abnormality processor 35, when the occurrence of the measurement abnormality is determined, may issue, for example, an alarm signal to enable the control device 3 to generate alarming sounds, to lighten an alarm lamp and/or to cause a display device to display a visual alarming indication and also to enable the grinding machine 1 to perform a quick return and halt. This quick return and halt is an operation to immediately return the grindstone 5 then performing a cutting, and then halt mechanically. The abnormality processor 35 may also be so designed and so configured that in the event of the determination of the measurement abnormality, in addition to the above described procedures, the measuring heads 2X and 2Y, once separated from the to-be-processed surface Wa, is again brought into contact with the to-be-processed surface Wa and the processing may be continued in the event that the difference between the measured values G1 and G2 of the two measuring heads 2X and 2Y immediately after the subsequent contact thereof with the to-be-processed surface Wa is smaller than or equal to Da. The separating operation and contacting operation of the measuring heads 2X and 2Y relative to the to-be-processed surface Wa may be repeated a plurality of times and, thereafter, the difference between the measured values G1 and G2 may be compared with the threshold value Da. The abnormality processor 35 may also be so designed and so configured as to perform an arbitrarily chosen processing operation subsequent to the abnormality detection.

Hereinafter, the processing and measuring operation done by the foregoing construction will be described with reference to FIG. 1 and the flow chart of FIG. 4 and the charts shown respectively in FIGS. 5 and 6.

As shown in FIG. 1, during the grinding of the workpiece W, the X-axis slide 17, best shown in FIG. 2, is moved in a direction indicated by B in FIG. 1 to allow the grindstone 5, then rotating, to be held in contact with and hence grind the workpiece W. During this grinding, the finish dimension of the workpiece W is controlled with the use of the sizing device 2 and the processing terminates when the measured values G1 and G2, which are the analog signals, of the two feeler Xa and Ya from the monitor 30, respectively, are captured by the control device 3 and the finishing dimension is attained.

Figure 5A:
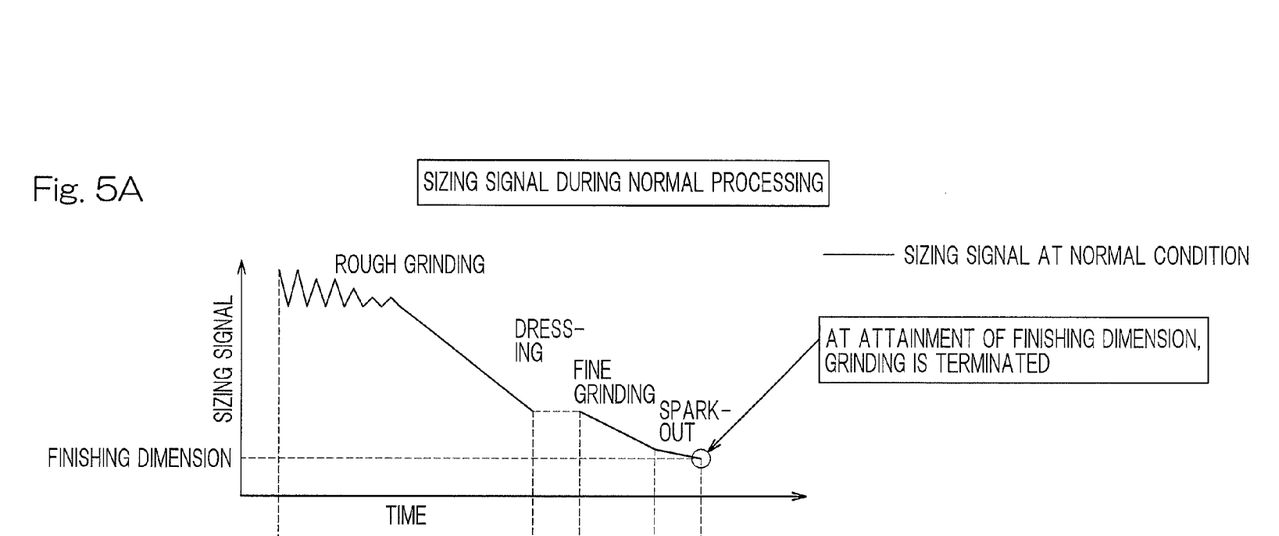
FIG. 5A is a chart showing values of a sizing signal, which is obtained during a normal condition from an output of the sizing device shown in FIG. 1.

FIG. 5A illustrates the sizing signal during the normal condition, which is depicted in a chart. This sizing signal is a value in which the respective output G1 and G2 of the two measuring heads 2X and 2Y are captured by the control device 3 from the monitor 30 during the grinding operation and which is obtained by calculating K1*G1+K2*G2 by the dimension calculator 32 of the control device 3. K1 and K2 in the equation referred to above represent respective correction coefficients. With passage of time, such grinding conditions as the speed of movement and others of the X-axis slide 17 in the order of the rough grinding, dressing, fine grinding and spark-out are changed and, when the finishing dimension is attained, the grinding operation terminates. The rough grinding and the fine grinding make use of the same grindstone 5, but involve respective speeds (cutting speeds) that are different from each other.

Figure 5B:
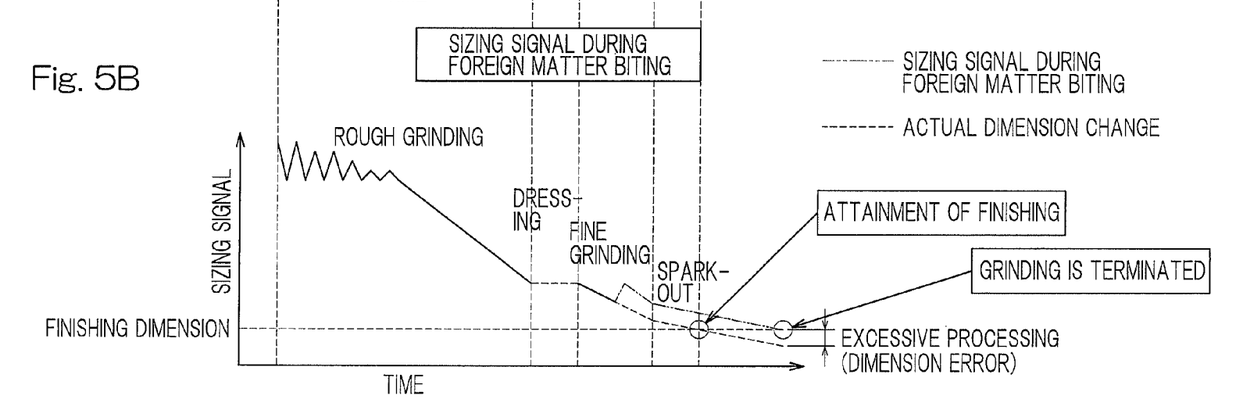
FIG. 5B is a chart showing values of a sizing signal, which is obtained from an output of the sizing device shown in FIG. 1 at the time of occurrence of a measurement abnormality of the sizing signal.

FIG. 5B illustrates the sizing signal, which is generated when the measurement abnormality occurs as a result of biting of foreign matter, depicted in a chart. When the foreign matter is bitten, the sizing signal (K1*G1+K2*G2) comes to be represented as shown by the double dotted line in FIG. 5B. For this reason, the actual dimension shown by the chain line becomes smaller than the sizing signal and, hence, the finishing dimension at the time of completion of the grinding decreases down to a value smaller than the expected processing dimension, resulting in generation of a dimensional error.

Figure 4:
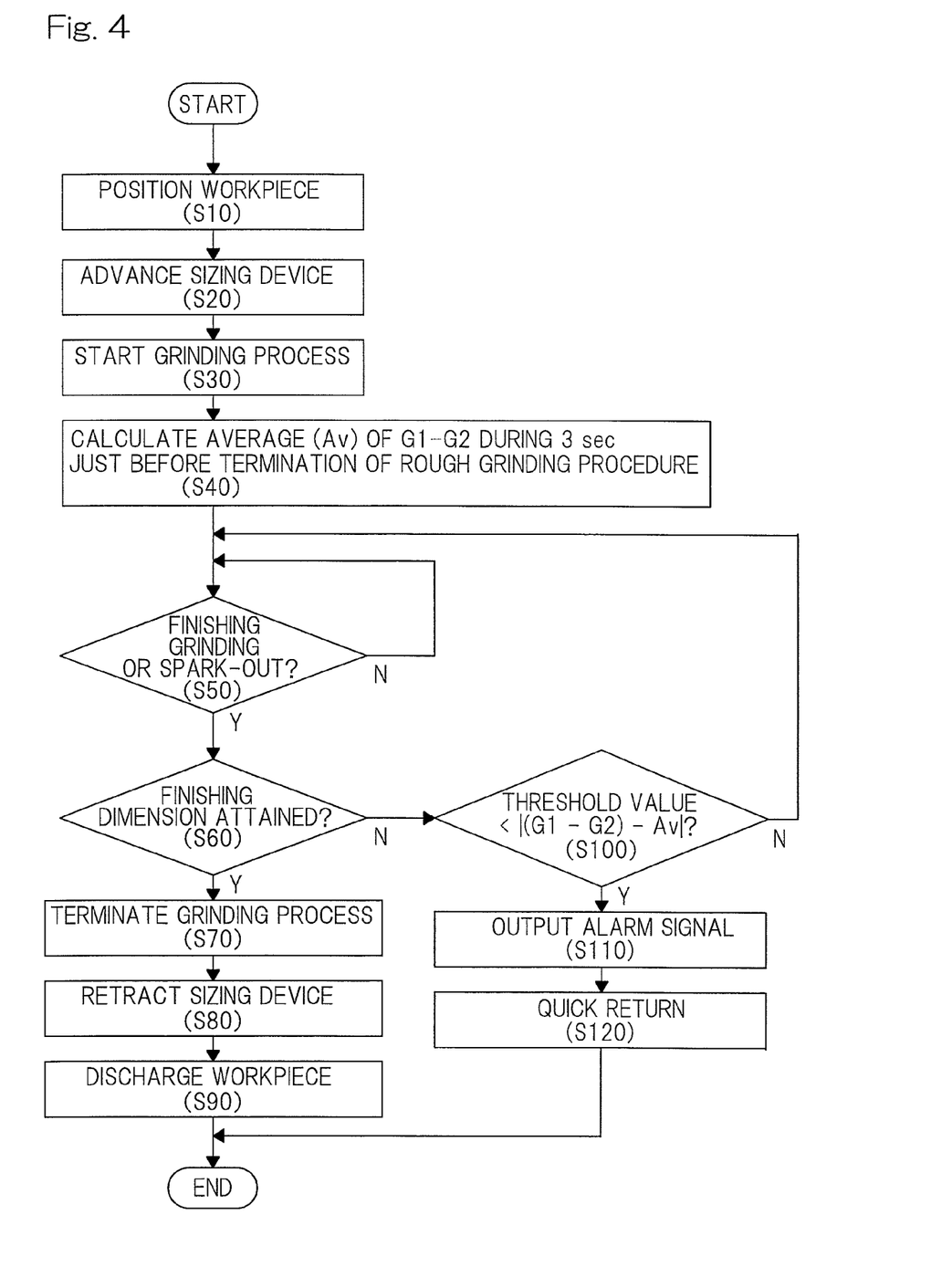
FIG. 4 is a flowchart showing the sequence of operation of the in-process diameter measuring apparatus equipped with the measurement abnormality function determining function shown in FIG. 1.

Referring to the control flow chart shown in FIG. 4, after the positioning of the workpiece W (step S10), the advance of the sizing device 2 (step S20) and the start of the grinding process (step S30), at step S40 the difference $\Delta\alpha$ between the measured value G1 of the first measuring head 2X and the measured value G2 of the second measuring head 2Y is continuously (repeatedly) captured to calculate the average Av of a predetermined time (for example, 3 seconds) immediately before the termination of the rough grinding. With this average Av rendered to be the reference value $\Delta\alpha 0$, the limit value of the predetermined range of plus and minus with respect to the reference value $\Delta\alpha 0$ intervening therebetween is rendered to be the difference threshold. This calculation is performed by the threshold calculator 33 shown in FIG. 1.

At step S50, decision is made to determine whether the fine grinding procedure or the spark-out procedure is taking place. In other words, the dressing procedures terminates and the determination of occurrence of the measurement abnormality is carried out during the fine grinding procedure or the spark-out procedure. If the decision at step S50 indicates the fine grinding procedure or the spark-out procedure taking place, decision is made at step S60 to determine if the finishing dimension is attained. If the finishing dimension is attained, the grinding process terminates at step S70, the sizing device is retracted at step S80 and the workpiece is discharged at step S90.

If at step S60 it is not determined that the finishing dimension is attained, during the fine grinding procedure or during the spark-out procedure, the predetermined difference threshold value Da and the absolute value of [(G1−G2)−Av] are continuously (repeatedly) compared at step S100 and, in the event of excess of the absolute value of [(G1−G2)−Av] over the difference threshold value Da (i.e., in the event of [|(G1−G2)−Av|>Da), the alarming signal is outputted from the abnormality processor 35 at step S110, followed by quick return and halt of the grinding machine 1 at step S120.

With the in-process diameter measuring apparatus with the measurement abnormality determining function operable with the grinding machine of the structure described above, the abnormality detection is determined not with the summed value of the respective outputs G1 and G2 of the measuring heads 2X and 2Y at the two locations, but with the difference (G1−G2) of those outputs. In the event of the bite of the foreign matter (such as, for example, ground dust and/or abrasive grains dropped out the grindstone), only the measured value of one 2X or 2Y of the measuring heads in which the biting has occurred becomes large and, therefore, the difference between the measured values G1 and G2 of those two measuring heads 2X and 2Y increased. On the other hand, during the dressing or the spark-out, the measured values G1 and G2 of the two measuring heads 2X and 2Y similarly change and the difference between the respective measured values of the two measuring heads 2X and 2Y does little change. For this reason, if the abnormality determination is carried out based on the measured value difference (G1−G2), an erroneous detection during the dressing procedure or the spark-out procedure can be avoided. Accordingly, the predetermined permissible range for the abnormality determination, that is, the difference threshold value can be set at a small value. Therefore, even in the event of occurrence of the measurement abnormality resulting from the bite of minor foreign matter, it can be detected by using this difference threshold value and, hence, the accuracy of abnormality detection can be increased. In view of the above, waste of workpieces hitherto processed at the time of occurrence of the measurement abnormality can be minimized and waste resulting from the later adjustment necessitated because of the erroneous detection can be minimized.

The timing at which the determination of occurrence of the abnormality by the measurement abnormality determiner 34 lies during a process step at which there is a possibility of the foreign matter being bitten and, in the flowchart shown in FIG. 4, such timing lies during the fine grinding procedure and the spark-out procedure (step S50). During the spark-out procedure, to detect the bite of the foreign matter, the abnormality determination is preferably performed. However, depending on the type and configuration of the grinding machine 1, in terms of avoiding detecting the erroneous operation or avoiding false positives, the abnormality determination may not be performed and the timing of the abnormality determination may lie only during the fine grinding.

In the period from the start of the grinding to the completion, during the dressing procedure or the spark-out procedure, the operation to separate the grindstone 5 from the to-be-processed surface Wa or to weaken the pressing force with which the grindstone 5 is pressed against the to-be-processed surface Wa temporarily with respect to the cutting direction of the grindstone 5 is performed. During such separation or weakening process, particularly during the dressing procedure, the measured values G1 and G2 outputted respectively by the measuring heads 2X and 2Y will become a meaningless value. Therefore, it is preferred that no abnormal determination is carried out at that time.

During the spark-out, the following problem is involved. Where the workpiece support mechanism 4 includes the magnet chuck 8 rotatable while attracting the workpiece W so as to produce a centripetal action and the first and second shoes 14 and 15, the workpiece W is supported so as to be urged towards the sides of the shoes 14 and 15, and slightly offset with respect to the chuck 8. In the spark-out procedure, as a result of the pressing by the grindstone being weakened, the offset referred to above will be reduced to zero. Consequently, the respective feelers Xa and Ya of the two measuring heads 2X and 2Y that are spaced from each other in a diametric direction move in the same direction and, hence, the change of the measured value G1 or G2 of each of the measuring heads 2X and 2Y resulting from the above mentioned movement will come to be contained in a difference of the values. Accordingly, the difference in measured values in the spark-out will increase abruptly, rendering the erroneous detection or false positives to be apt to occur. For this reason, in the spark-out, it may be preferable that the determination of the measurement abnormality by the measurement abnormality determiner 34, which performs the determination based on the previously described difference, will not be carried. Alternatively, in the spark-out, the measurement abnormality may be determined with the use of a larger difference threshold value than that used in the fine grinding.

Also, in this embodiment, with respect to the difference between the measured values G1 and G2 of the two measuring heads 2X and 2Y which have been captured during the predetermined reference calculation measurement period in the process, the predetermined statistical process is applied to determine the reference value $\Delta\alpha 0$ and, then, the difference threshold value Da, which is the limit value of the predetermined allowable range is determined on the basis of this reference value $\Delta\alpha 0$. Thus, the abnormality detection of a further high reliability can be accomplished.

In other words, as a method of determining the difference threshold value Da of the proper predetermined allowable range, measurement may be done with the use of a master work and it may be determined using the measured value of the master work or by means of a design calculation. However, at the time a number of workpieces are successively ground, a thermal displacement resulting from a processing heat and others may occur depending on the time passed subsequent to the time at which an electric power source for the grinding machine 1 is turned on. In such case, in order to accomplish the abnormality determination, a proper difference threshold value can be determined when the measured value in a condition, in which the thermal displace occurs, is used, in comparison with the case of employing a master work. Also, by statically processing the measured value for a plurality of times, a proper reference value $\Delta\alpha 0$ can be determined even though variation occurs among the individual measured values. By determining the difference threshold value Da on the basis of this reference value $\Delta\alpha 0$, false erroneously detection or false positives can be eliminated and the abnormality detection of a high reliability can be accomplished even though the threshold value Da is chosen to be a small value.

The statistical processing performed by the threshold calculator 33 as hereinabove described is determined by the average value of the difference of the measured values G1 and G1 of the two respective measuring heads 2X and 2Y. Accordingly, the proper threshold value can be determined with a simple calculation.

Also, in the embodiment described hereinabove, since the reference calculation measuring period is chosen to be a period just before the termination of the rough grinding procedure, the proper reference value can be obtained. The workpiece W to be ground may often have a black bark when heat treated as the preliminary procedure and, even when no black bark is developed, the surface may be rough. Also, in the rough grinding procedure, the need of implementing the abnormality detection involving the foreign matter bite is little. Therefore, it is most proper that the period just before the termination of the rough grinding procedure is defined as the reference calculation measuring period.

The abnormality processor 35 is such that when, as hereinbefore described, the measurement abnormality is determined by the measurement abnormality determiner 34, the first and second measuring heads 2X and 2Y, once contacting the to-be-processed surface Wa, are again held in contact with the to-be-processed surface Wa and if the difference between the measured values G1 and G2 of the two measuring heads 2X and 2Y after they are again held in contact with the to-be-processed surface is within the predetermined allowable range, the processing is preferably continued as hereinbefore described.

When the measurement abnormality is determined, temporal separation of the first and second measuring heads 2X and 2Y from the to-be-processed surface may result in elimination of the biting of the foreign matter. Thus, if the difference between the measured values G1 and G2 of the two measuring heads 2X and 2Y after they are again brought into contact with the to-be-processed surface W, is not abnormal, continuance of the processing makes it possible to perform the grinding process without the processing unnecessarily interrupted and also with no problem of measurement abnormality occurring.

It is to be noted that in describing the foregoing embodiment, the sizing device 2 has been shown and described as having the two measuring heads 2X and 2Y, the sizing device 2 may be of a type that has independent sizing devices. In such case, respective outputs of the two sizing devices are utilized.

Also, in the foregoing embodiment, reference has been made to the inner periphery grinding, but the in-process diameter measuring apparatus with the measurement abnormality determining function can be applicable even to an outer periphery grinding. In such case, the measuring heads are caused to contact a to-be-processed face which is an outer peripheral surface.

Also, although in the foregoing embodiment, the control device 3 has been shown and described as comprised of the programmable controller and the motion controller, any other various calculation processing device can be used as the control device 3.

Although the present invention has been described in connection with preferred embodiments with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE SIGNS

1: Grinding machine
2: Sizing device
3: Control device
4: Workpiece support mechanism
5: Grindstone
6: Grindstone drive mechanism
10: Shoe mechanism
32: Dimension calculator
34: Measurement abnormality determiner
G1, G2: Measured value
W: Workpiece
Wa: To-be-processed surface
2X, 2Y: Measuring head

What is claimed is:

1. An in-process diameter measuring apparatus equipped with a function of determining a measurement abnormality of a grinding machine, the grinding machine including:
   a workpiece support mechanism to support a workpiece of a circular shape in section and to rotate the workpiece about a center axis;
   a grindstone drive mechanism to grind a to-be-processed surface using a grindstone, the to-be-processed surface including an inner peripheral surface or an outer peripheral surface of the workpiece; and
   a control device configured to control the workpiece support mechanism and the grindstone drive mechanism,
   the apparatus measuring the diameter of the to-be-processed surface of the workpiece during the process of the workpiece, and the apparatus comprising:
   a sizing device to include a plurality of measuring heads that contact a plurality of respective circumferential locations of the to-be-processed surface, the plurality of circumferential locations including at least two locations spaced apart from each other in a diametric direction of the to-be-processed surface of the workpiece, and to measure respective diametric positions of the locations which the heads contact;
   a dimension calculator configured to calculate the diameter of the to-be-processed surface based on measured values of the plurality of the measuring heads of the sizing device; and
   a measurement abnormality determiner configured to determine a difference between measured values of the two measuring head out of the plurality of the measuring heads, the measuring heads measuring respective positions of the respective two locations of the to-be-processed surface that are spaced apart from each other in a diametric direction, and to determine the occurrence of a measurement abnormality in the event that the difference departs from a predetermined permissible range.

2. The in-process diameter measuring apparatus as claimed in claim 1, wherein in a period from the start of grinding of the to-be-processed surface to the completion thereof, the control device performs a separating or weakening operation to separate the grindstone from the to-be-processed surface temporarily along a cutting direction of the grindstone or to weaken a pressing force acting on the to-be-processed surface in a cutting direction of the grindstone and wherein the measurement abnormality determiner stops determining the occurrence of the measurement abnormality during the separating or weakening operation.

3. The in-process diameter measuring apparatus as claimed in claim 2, wherein the workpiece support mechanism includes a magnet chuck to attract one end face of the workpiece with a magnetic force and to rotate such workpiece so as to develop a centripetal action, and two shoes to support the workpiece, in a fashion slightly offset from a center of rotation of the magnet chuck, in contact with two locations within the semicircle of a circumferential surface of the workpiece and wherein the separating or weakening operation is executed during a spark-out procedure in which a process is performed by the utilization of an elastic restoring force induced by an elastic deformation that occurs in a grindstone support member while a progress of cutting of the grindstone is interrupted.

4. The in-process diameter measuring apparatus as claimed in claim 1, further comprising:
   a threshold calculator configured to determine a reference value by performing a predetermined statistical procedure on a difference between respective measured values of the two measuring heads, the measured values being captured during a predetermined reference calculation measuring period in the process of the workpiece and to calculate a threshold value, the threshold value being a limit value of the predetermined permissible range with respect to the reference value, and wherein the measurement abnormality determiner performs the determination of the measurement abnormality in a processing subsequent to the calculation of the threshold value.

5. The in-process diameter measuring apparatus as claimed in claim 4, wherein the statistical procedure performed by the threshold calculator is a procedure to determine the average of a plurality of differences of a respective plurality of a pair of the measured values of the two respective measuring heads, the plurality of the pair of the measured values being captured during the predetermined reference calculation measuring period.

6. The in-process diameter measuring apparatus as claimed in claim 4, wherein the control device causes the grinding machine to perform a rough grinding procedure to roughly process the workpiece and a fine grinding procedure to finely process the workpiece at a cutting speed of the grindstone which is lower than that during the rough grinding procedure and wherein the reference calculation measuring period is rendered to be a period just before termination of the rough grinding procedure.

7. The in-process diameter measuring apparatus as claimed in claim 1, wherein the control device causes the grinding machine to perform a rough grinding procedure to roughly process the workpiece, a fine grinding procedure to finely process the workpiece at a cutting speed of the grindstone which is lower than that during the rough grinding procedure, and a spark-out procedure to process the workpiece by the effect of an elastic restoring force induced by an elastic deformation that occurs in a grindstone support member while a progress of cutting with the grindstone is interrupted, and wherein the measurement abnormality determiner performs the determination of the measurement abnormality during any one of the fine grinding procedure, and the fine grinding and spark-out procedures.

8. The in-process diameter measuring apparatus as claimed in claim 7, wherein the workpiece support mechanism includes a magnet chuck to attract one end face of the workpiece with a magnetic force and to rotate such workpiece so as to develop a centripetal action, and two shoes to support the workpiece, in a fashion slightly offset from a center of rotation of the magnet chuck, in contact with two locations within the semicircle of a circumferential surface of the workpiece and wherein the control device causes the grinding machine to perform a dressing procedure comprised of an operation to dress, while the grindstone is moved to a dressing device, during a time span between the rough grinding procedure and the fine grinding procedure and to subsequently return the grindstone back to a position before the dressing; and further comprising:
   a threshold calculator configured to determine a reference value by performing a predetermined statistical procedure on a difference between respective measured values of the two measuring heads, the measure values being captured during a predetermined reference calculation measuring period in process of the workpiece and to calculate a threshold value, wherein
   the predetermined reference calculation measuring period is rendered to be a period just before the termination of the rough grinding procedure, and the statistical procedure is a procedure to determine the average of a plurality of differences of a respective plurality of a pair of the measured values of the two respective measuring heads, the plurality of the pair of the measured values being captured during the predetermined reference calculation measuring period.

9. The in-process diameter measuring apparatus as claimed in claim 1, wherein the control device causes the two measuring heads to be again brought into contact with the to-be-processed surface once separated therefrom, in the event that the measurement abnormality is determined by the measurement abnormality determiner, and causes the processing to continue when the difference between the respective measured value of the two measuring heads, after they are again brought contact, falls within the predetermined permissible range.

10. An in-process diameter measuring method with a function of determining a measurement abnormality of a grinding machine, the grinding machine including:
   a workpiece support mechanism to support a workpiece of a circular shape in section and to rotate the workpiece about a center axis;
   a grindstone drive mechanism to grind a to-be-processed surface using a grindstone, the to-be-processed surface including an inner peripheral surface or an outer peripheral surface of the workpiece;
   a control device configured to control the workpiece support mechanism and the grindstone drive mechanism,
   the method measuring the diameter of the to-be-processed surface of the workpiece in the process of the workpiece by means of the grinding machine, and the method comprising:
   measuring a plurality of radial positions of the to-be-processed surface in a circumferential direction, the plurality of positions including at least two locations of the to-be-processed surface of the workpiece which are spaced apart from each other in a diametric direction;
   measuring the diameter of the to-be-processed surface of the workpiece by calculating the diameter of the to-be-processed surface based on the radial positions of the plurality of measured positions; and
   determining the difference of the measured radial positions at the two locations of the to-be-processed surface that are spaced apart from each other in the diametric direction and then determining the occurrence of a measurement abnormality in the event that the difference departs from a predetermined permissible range.

11. The in-process diameter measuring method as claimed in claim 10, further comprising:
   measuring a plurality of times the radial positions of the two locations of the to-be-processed surface, which are spaced apart from each other in the diametric direction, before the occurrence of the measuring abnormality is determined, during a predetermined reference calculation measuring period in the process of the workpiece;
   determining a plurality of differences of the radial positions, which are measured the plurality of the times;
   performing a predetermined statistical procedure of the plurality of the difference so determined to thereby determine a reference value;
   calculating a threshold value, the threshold value being a limit value of the predetermined permissible range with respect to the reference value,
   wherein the determination of the occurrence of the measurement abnormality includes determining the occurrence of the measurement abnormality if the difference of the measured radial positions at the two locations of the to-be-processed surface spaced apart from each other in the diametric direction is greater than the threshold value.

12. The in-process diameter measuring method as claimed in claim 11, wherein the statistical procedure is a procedure to determine the average value of the plurality of the differences.

* * * * *